US006902643B2

(12) United States Patent
Arcaro et al.

(10) Patent No.: US 6,902,643 B2
(45) Date of Patent: Jun. 7, 2005

(54) THERMAL TRANSFER OVERCOAT TAG REDUCTION

(75) Inventors: David J. Arcaro, Boise, ID (US); Miquel Boleda, Barcelona (ES); Gary E. Hanson, Meridian, ID (US); Stephen M. Ledak, Santee, CA (US); David M. Kwasny, Corvallis, OR (US); Eric L. Burch, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/285,121

(22) Filed: Oct. 31, 2002

(65) Prior Publication Data

US 2004/0086313 A1 May 6, 2004

(51) Int. Cl.$^7$ ......................... B32B 31/20; B32B 31/10; B32B 31/04

(52) U.S. Cl. ....................................... 156/247; 156/344

(58) Field of Search ................................ 156/540, 552, 156/555, 247, 344, 584; 347/101, 105, 216, 155, 212

(56) References Cited

U.S. PATENT DOCUMENTS

| | | | | | |
|---|---|---|---|---|---|
| 3,684,628 | A | * | 8/1972 | Clarke et al. | 156/583.3 |
| 4,346,855 | A | * | 8/1982 | Biggar, III | 156/267 |
| 4,738,555 | A | | 4/1988 | Nagashima | |
| 4,815,872 | A | | 3/1989 | Nagashima | |
| 5,520,763 | A | | 5/1996 | Johnstone | |
| 5,555,011 | A | | 9/1996 | Tang et al. | |
| 5,578,824 | A | | 11/1996 | Koguchi et al. | |
| 6,171,429 | B1 | | 1/2001 | Aindow et al. | |
| 6,223,799 | B1 | | 5/2001 | Johnstone | |
| 6,554,044 | B2 | * | 4/2003 | Paulson et al. | 156/540 |
| 6,684,925 | B2 | * | 2/2004 | Nagate et al. | 156/540 |
| 2002/0027586 | A1 | | 3/2002 | Kikuchi et al. | |
| 2002/0108709 | A1 | * | 8/2002 | Fukada | 156/344 |
| 2003/0121612 | A1 | * | 7/2003 | McKay et al. | 156/540 |

FOREIGN PATENT DOCUMENTS

| | | | | | |
|---|---|---|---|---|---|
| JP | 08026235 | A | * | 1/1996 | B65C/9/18 |
| JP | 10324319 | A | * | 12/1998 | B65C/1/02 |

OTHER PUBLICATIONS

James Knieser, "Skewed Blade Stripper," Nov./Dec. 1977, Xerox Disclosure Journal, , vol. 2, No. 6, pp. 85–86.*

* cited by examiner

*Primary Examiner*—Daniel J. Colilla

(57) ABSTRACT

A thermal transfer overcoating technology for reducing overcoat tags. Skewing the interface between a carrier ribbon to coated document at the peeling of the carrier from the coated document concentrates the forces at the interface to a smaller region of the document edge. Moreover, tensioning the document at the interface changes the forces at the interface from peeling type to tensile type.

9 Claims, 2 Drawing Sheets

THERMAL TRANSFER OVERCOAT TAG REDUCTION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND OF THE INVENTION (1)Field of the Invention

The present invention relates generally to thermal transfer overcoat technology.

(2) Description of Related Art

In thermal transfer overcoat technology, a thin film is produced on a document to provide durability and a glossy finish. A generic thermal transfer overcoat apparatus 100 is illustrated by FIG. 1 (Prior Art). An automatic document feeder ("ADF") 101, as would be known in the art, feeds a pre-printed document (represented by the so-labeled arrow and horizontal line) into a nip between a pressure roller 103 and a heat roller 105. An overcoat film 107 from a film supply reel 109 is threaded through the same nip. The film 107 is generally a thermally-transferable adhesive laminate material, activated by the heat roller 105, to form a clear overcoat on the printed surface of the document. The laminate generally includes a backing, viz, an expendable carrier ribbon, a clear coating material, and an intermediate adhesive release layer. After passing through the nip, a peel bar device 111 downstream of the nip separates the backing of the film 107 away from the now-overcoated document 113 (represented as two parallel lines). A film take-up reel 115 receives the film backing material. The now-overcoated document 113 is transported to the apparatus output in a known manner.

One goal of the thermal transfer overcoat is to produce an overcoated image on a print medium substrate that does not have any extra overcoat material—known in the art as "tags"—extending over an edge of the document substrate. The tag phenomenon occurs when the cohesive strength of the overcoat material itself is greater than the peeling release force holding the overcoat to its carrier ribbon. The phenomenon is most prevalent at the trailing edge. The tag may be manifested as flakes of coating hanging from the edge of the coated substrate. These flakes are unsightly and can contaminate the coated document, yielding print quality problems. Moreover, the flakes can break off and contaminate the apparatus mechanism, creating reliability problems. Still further, the flakes may pose a hazard to the user as they may be breathed in or adhered to skin or clothing by static electricity forces, and may be even rubbed into the eyes. In general, the attaining of clean edges requires a force that keeps the excess overcoating layer of the film on the carrier at peeling.

FIGS. 2A and 2B (Prior Art) show the perpendicular peel approach where a peel bar 111 is perpendicular to the direction of travel (see, so-labeled arrows) of the document 113 and the film 111. In the prior art, in those areas where there is no substrate, planar peeling-action forces are imposed by the peel bar device 111.

One idea for obtaining a clean edge is described in U.S. Pat. No. 5,555,011 (Tang). A transport system moves a dye-donor web and the receiver medium in a reverse direction along their respective path such that the area of the laminate material which is transferred to the receiver medium breaks cleanly at the trailing edge from a non-laminated area of the laminate material that remains on the dye-donor web as the web support separates from the receiver medium.

A mechanically simpler, easily implemented, low cost, reliable, and effective alternative has been discovered and is described herein.

BRIEF SUMMARY OF THE INVENTION

The present invention provides a method and apparatus for thermal transfer overcoat tag reduction.

The foregoing summary is not intended to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings referred to in this specification should be understood as not being drawn to scale except if specifically annotated.

DETAILED DESCRIPTION OF THE INVENTION

Figure 2A:
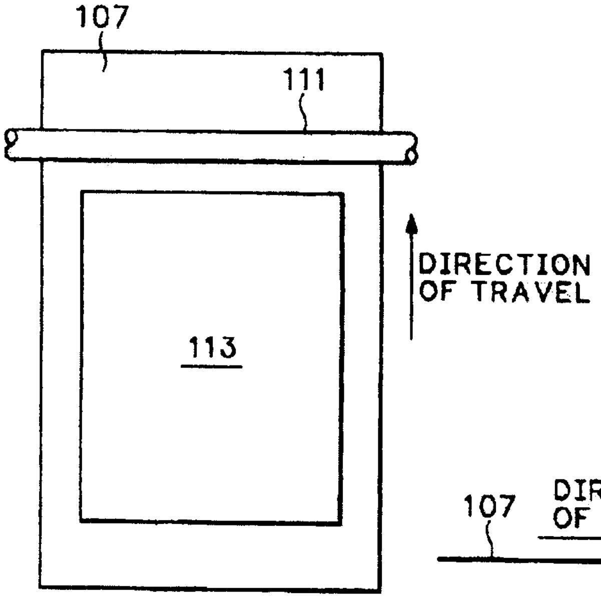
FIG.2A (PRIOR ART)
FIGS. 2A and 2B (Prior Art) show a typical perpendicular peel-force approach to separating thermal transfer overcoat coating material from a carrier.
Figure 2B:
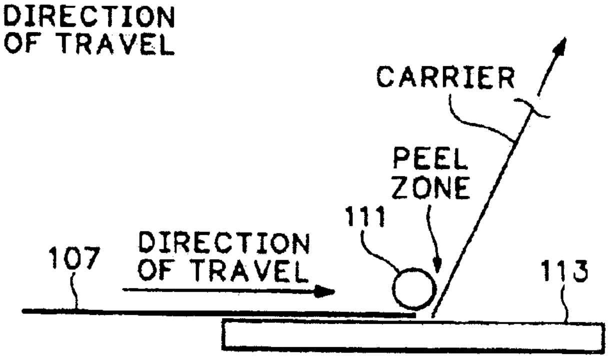
FIG.2B (PRIOR ART)

It has been observed that tagging is usually worse at the trailing edge of an overcoated document due to the spreading of the shear force along the whole trailing edge in the perpendicular approach to the peel bar 111 as illustrated by FIGS. 2A and 2B. This is observed to be in contrast to characteristics of the operation along the side edges of the document where only a very small area of the overcoat-to-media edge enters the peel area at any time, thus maximizing the shear force.

It has been found that the shear force can be magnified at the leading and trail edges along the direction of travel by an angled-approach of a coated document to a peel zone. FIG.

3A illustrates a first exemplary embodiment in which a peel bar 111 is skewed with respect to the direction of travel (see labeled arrow) of the document 113 and film 107. With the angled-approach, the document 113 leading edge 301 and trailing edge 302 are forced to simulate a perpendicular approach document side edge interface with the peel bar 111. Only a relatively small area of each leading and trailing edge 301, 302 is exposed to the peel bar 111, in other words, within a "peel zone" (see so-labeled region) along the direction of travel, at a given time as the document 113 is separated from the carrier 303 which is then wrapped about the take-up reel 115. This angled-approach limits and thus maximizes the shear force at that small area where peeling is currently occurring rather than having a peeling force spread simultaneously across the whole edge 301, 302 simultaneously.

Figure 3A:
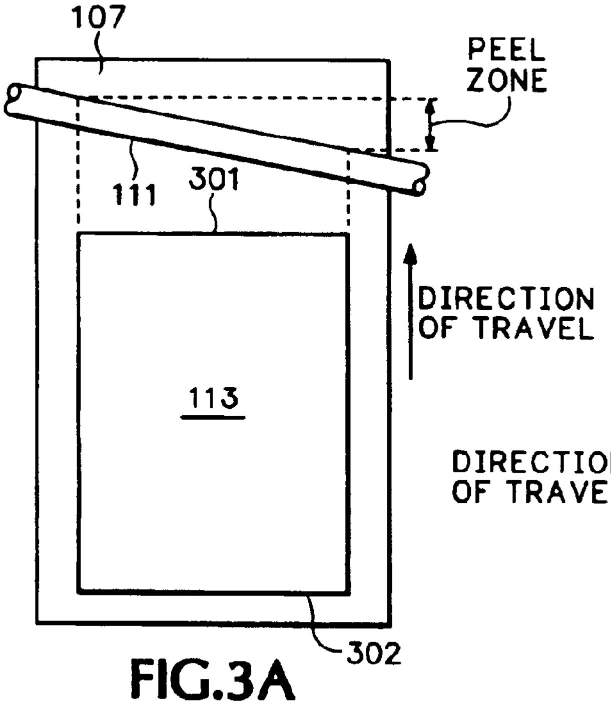
FIG. 3A is a schematic illustration in an overhead view according to one exemplary embodiment of the present invention.
Figure 3B:
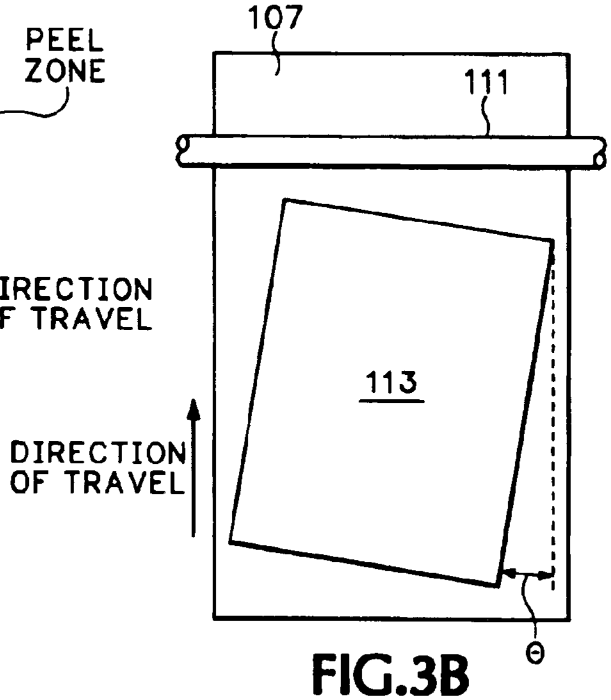
FIG. 3B is a schematic illustration in an overhead view according to a second exemplary embodiment of the present invention.

FIG. 3B shows an alternative exemplary embodiment. While the peel bar 111 is perpendicular to the direction of travel (labeled arrow) of the film 107 as in FIGS. 2A and 2B, the document 113 has been overcoated in the nip (see FIG. 1) by the ADF 101 feeding the document at a skew angle, theta (0), to the direction of travel. Again, as with the exemplary embodiment of FIG. 3A, the interface between the document 113 and the peel bar 111 will be angular rather than perpendicular (compare FIG. 2A and FIG. 3B). Again, this angled-approach limits and thus maximizes the shear force at that small area where peeling is currently occurring. As many design implementations of the embodiment may constructed and each will related to specific design parameters for the film, media types, throughput, and the like parameters known to persons skilled in the art, the specific skew angle will vary accordingly. For an experimental implementation tested by the applicants for A-size paper, having a throughput speed of approximately 0.5 inches per second, a skew angle in the approximate range of five (5) to ten (10) degrees was successfully employed. Specific implementations may vary as throughput speeds in the range of 0.3 to 0.5 inch per second and skew of +–0.6% were employed in the specific experiments of the inventors with satisfactory results.

Figure 4:
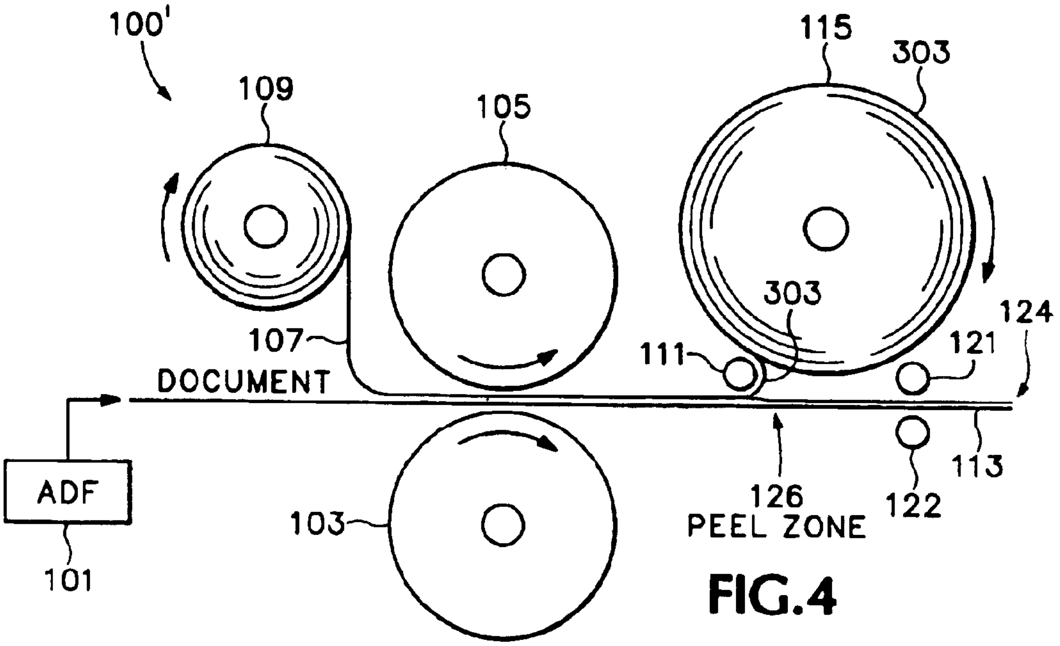
FIG. 4 is a schematic elevation view of apparatus according to another exemplary embodiment of the present invention.

FIG. 4 is a schematic drawing in elevation view of a thermal transfer overcoat mechanism providing an additional mechanism for reducing tags on the trailing edge of the document 113. It has been found that applying tension to the document substrate during the peel will result in a significant reduction and substantial elimination of trailing edge tags in a thermal transfer overcoat apparatus 100'. A pair of pressure-contact exit rollers 121, 122, at least one of which is driven, receives the leading edge 124 in a nip therebetween downstream of the peel device 111. Tensioning of the document substrate at the peel can be achieved by driving the exit rollers 121, 122 at a higher speed than that of the carrier ribbon onto the take-up reel 115. Slippage at the exit rollers surfaces in the nip, or via inclusion of a known-manner slip-clutch mechanism (not shown) in the drive train of the driven roller 122, provides a requisite tension at the peel zone 126. It has been found that for an experimental implementation relying on slippage at the exit rollers surfaces in the nip, where a throughput speed of approximately 0.5 inch/second was in progress, an overdrive speed in the approximate range of one percent (1%) to three percent (3%) was employed; in an experimental implementation using a slip clutch mechanism, an overdrive speed in the approximate range of one percent (1%) to eight percent (8%) was employed. Again, specific implementations will be dependent on the characteristics of the film, media types, throughput, and the like parameters known to persons skilled in the art. In other words, it will be recognized by those skilled in the art that the variables can be tuned to achieve satisfactory results.

Figure 1:
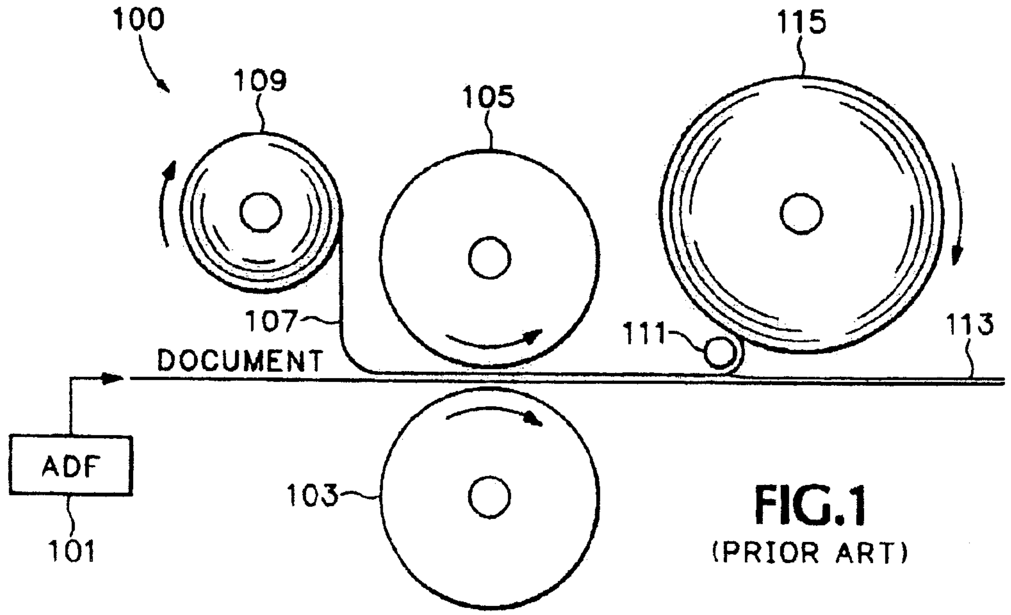
FIG.1 (PRIOR ART)
FIG. 1 (Prior Art) is a schematic illustration in an elevation view depicting a thermal transfer overcoat apparatus and process.

Thus, rather than allowing the tag to peel away from the carrier ribbon as would be the norm for the apparatus as shown in FIG. 1, the tensioning takes advantage of a stress concentration formed at the substrate's advance through the peel zone 126, creating a condition where the release layer between the coating material and the carrier ribbon is loaded in tension rather than in peel. The combination of these factors results in the coating breaking cleanly at the trailing edge with minimal tagging, if any.

A skewed operation is shown in FIG. 3A or 3B. In the embodiment of FIG. 3A, the paper sheet 113 is longitudinally aligned with a skewed peel bar 111. In the embodiment of FIG. 3A, the peel bar 111 is perpendicular to the direction of travel and the paper sheet 113 is skewed. Note for the overdrive roller type of operation described with respect to FIG. 4, it is preferred that the peel bar not be skewed, allowing the coating to break in tension at once along the entire trailing edge of the sheet.

Other implementations of the methodology may be employed. For example, rather than overdriving the rollers, take-up tension can be controller by controlling the torque at the take-up motor. In this manner, one embodiment was shown to produce satisfactory results with take-up tension in the range of 1500–2000 gr. force. Another implementation may incorporate a skew to the take-up reel to produce the shear force at a small area where peeling is currently occurring.

The foregoing description of exemplary and preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiments were chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. Thermal transfer overcoating system, comprising:

means for coating a thermal transfer overcoat film, having a separable carrier, onto a print medium;

means for separating the carrier from the print medium, wherein leading and trailing edges of said medium form a linear interface with said means for separating such that the linear interface extends between opposite sides of the medium and is at an oblique angle to a direction of travel of the firm and the medium; and downstream of the means for separating, means for receiving the print medium and for tensioning the medium in the direction of travel such that at said means for separating the film is loaded in tension, wherein said means for receiving the print medium and for tensioning the medium in the direction of travel includes means for overdriving the medium in the direction of travel relative to a speed at the linear interface.

2. The system as set forth in claim 1, wherein said means for separating includes a peel bar mounted askew to the direction of travel.

3. The system as set forth in claim 1, wherein said leading and trailing edges of said medium are a skewed with respect to the direction of travel.

4. A method for peeling a carrier from a film, the method comprising:

adhering a thermal transfer overcoat film having a carrier layer, an adhesive layer, and an overcoating layer, to document; and separating the carrier layer from the document at a skewed linear interface between a direction of travel of the document and a device for said separating, wherein the skewed linear interface extends between opposite sides of the document, and wherein the skewed linear interface is formed by the document oriented at a skew oblique angle to the direction of travel.

5. The method as set forth in claim 4, further comprising:

tensioning said document in said direction of travel such that said separating is caused by loading at the interface in tension.

6. A method for peeling a carrier from a film, the method comprising:

adhering a thermal transfer overcoating film, having a carrier layer, an adhesive layer, and an overcoating layer, to a document;

separating the carrier layer from the document at a skewed interface between a direction of travel of the document and a device for said separating; and tensioning said document in said direction of travel such that said separating is caused by loading at the interface in tension, said tensioning comprising overdriving the document in the direction of travel at a speed greater than the relative speed at the interface.

7. A thermal transfer overcoat apparatus, comprising:

a thermal transfer overcoat film having a carrier and a document coating material;

a thermal transfer overcoat mechanism for mating the film to a document;

downstream of the thermal transfer overcoat mechanism, a peel zone having a detaching mechanism for detaching the carrier from the document; and downstream of the detaching mechanism, a mechanism for overdriving the document and putting the document in tension at the peel zone such that loading at said peel zone is in tension.

8. The apparatus as set forth in claim 7, wherein an oblique angle is formed between said document and said detaching mechanism in the peel zone.

9. A thermal transfer overcoating system, comprising:

a document having leading and trailing edges skewed relative to a direction of travel of the document;

a supply of thermal transfer overcoating film;

a device for thermally adhering overcoating material of the film to the document in an overcoating zone;

a peeling device for separating backing material of the film from an overcoated document;

a device downstream of the peeling device for receiving expended carrier material of the film; and a pair of rollers, at least one of which is a driven roller, forming a nip downstream of the overcoating zone, wherein said pair of rollers receive the leading edge of the overcoated document in the nip and are overdriven with respect to throughput speed of the overcoated document at the peeling device, wherein said peeling device is substantially perpendicular in the approximate force of and with respect to the direction of travel of the document, wherein a linear interface of the peeling device extends between opposite sides of the document and is skewed with respect to said leading and trailing edges of the document.

* * * * *

UNITED STATES PATENT AND TRADEMARK OFFICE

CERTIFICATE OF CORRECTION

PATENT NO. : 6,902,643 B2 
APPLICATION NO. : 10/285121
DATED : June 7, 2005
INVENTOR(S) : David J. Arcaro et al.

It is certified that error appears in the above-identified patent and that said Letters Patent is hereby corrected as shown below:

Column 3, line 22, delete “theta (0)” and insert therefor --theta (Θ)--

Column 5, Claim 1, line 3, delete “firm” and insert therefor --film--

Signed and Sealed this

Twelfth Day of December, 2006

JON W. DUDAS
*Director of the United States Patent and Trademark Office*